United States Patent
Burke

[11] 3,807,743
[45] Apr. 30, 1974

[54] FLUID SEAL HAVING PUMPING ELEMENTS AND COOPERATING AUXILIARY LIP
[75] Inventor: James E. Burke, Wheaton, Ill.
[73] Assignee: Chicago Rawhide Manufacturing Company, Chicago, Ill.
[22] Filed: May 28, 1971
[21] Appl. No.: 148,053

[52] U.S. Cl. .............................................. 277/134
[51] Int. Cl. ........................... F16j 15/54, F16j 9/00
[58] Field of Search .................................... 277/134

[56] References Cited
UNITED STATES PATENTS
3,497,225  2/1970  Workman ........................... 277/134
3,534,969  10/1970  Weinand ............................ 277/134 X Primary Examiner—Samuel B. Rothberg

[57] ABSTRACT
An oil seal capable of pumping oil lying on a shaft or like member axially of the shaft upon rotation thereof into the sealed region. In a preferred form, the seal includes an elastomeric body having a primary lip and a plurality of individual pumping elements, an auxiliary lip which extends between elements. In the preferred form, the pumping elements are of wedge-like form and are being radially spaced relative to one another and thereby adapted for successive operative engagement with an associated shaft or other relatively movable element only after a certain amount of wear has taken place with respect to certain of the other of the elements. The auxiliary lip ordinarily lies in a plane parallel to the primary lip. In the use of the preferred form of seal, as the elements lying closer to the movable element wear and become less effective to pump oil, other of the elements will inherently be brought into cooperative working engagement with the movable element in order to provide continued pumping action throughout an extended life of the seal unit. The secondary or auxiliary lip restrains fluid from passing axially too far away from the primary lip and prevents oil from collecting on the elements. The auxiliary lip concept may also be applied to seals having other forms of pumping elements. The mold core and method of making it are also described.

6 Claims, 7 Drawing Figures

PATENTED APR 30 1974 3,807,743
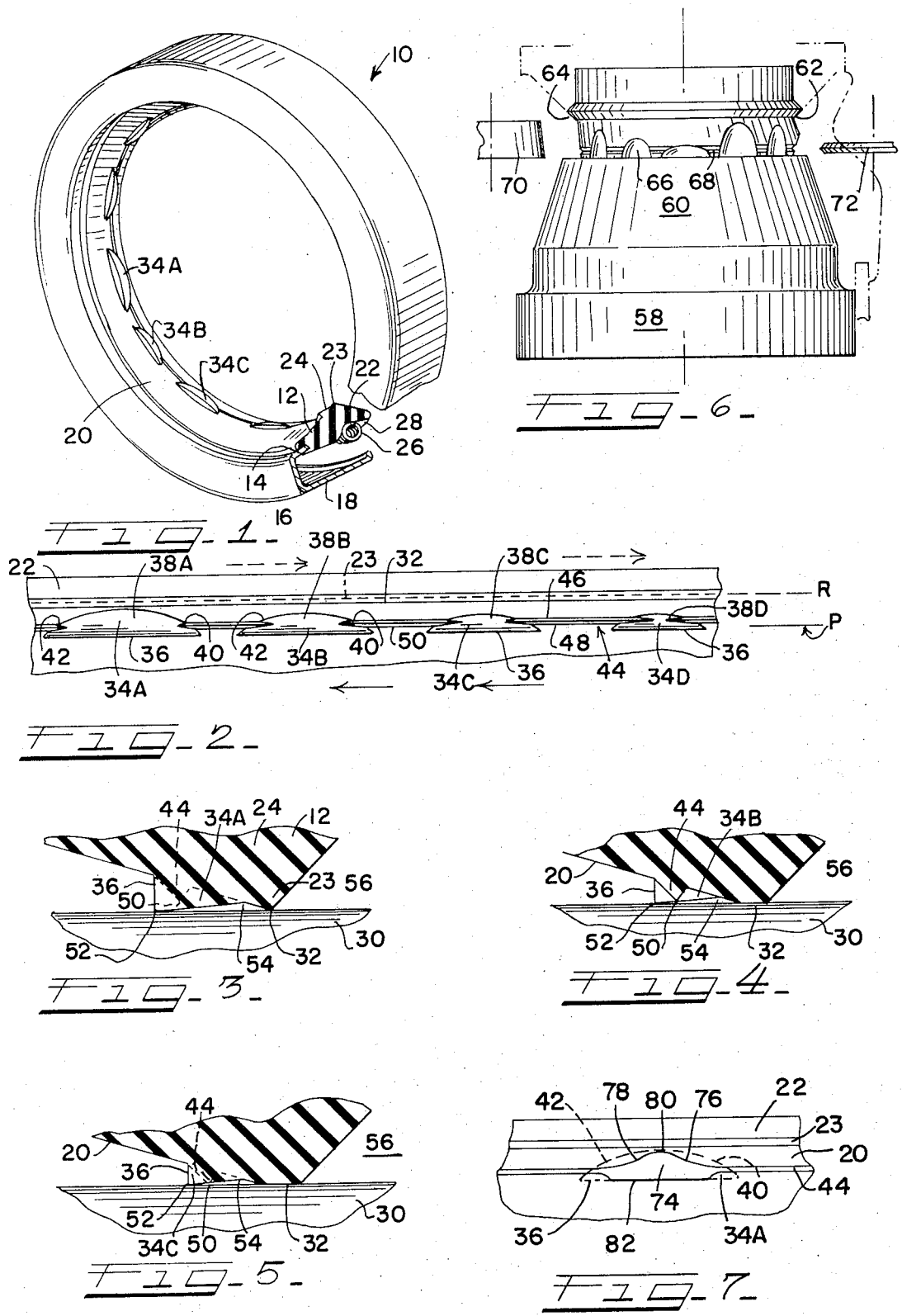

FLUID SEAL HAVING PUMPING ELEMENTS AND COOPERATING AUXILIARY LIP

BACKGROUND OF THE INVENTION

The present invention relates to fluid seals, and, more particularly, to shaft seals or like radially acting seals having a hydrodynamic or pumping action which serves to pump back into the sealed region oil tending to pass therefrom under the primary or wet lip and axially outwardly along an associated shaft or other surface being sealed. Seals of this type are already generally known and some designs thereof have achieved a certain degree of commercial success. However, as in the case of a number of products which are not fully developed, there is substantial room for additional development and improvement, particularly in the areas of extended seal life, consistent performance and ease of manufacture, and specialized performance capabilities.

Oil seals having a pumping action are known to be desired for certain applications, particularly those wherein fluid loss is most likely occur at high speeds than at low speeds or in a static condition of the movable parts. Seals of this general type are often referred to as hydrodynamic seals from the pumping action which occurs in the presence of dynamic forces rather than static forces, usually by reason of relative movement of a physical body through a viscous fluid adsorbed on another physical body.

Although it may be superficially supposed that oil seals, to be effective, ride in a very tight fitting relation to an associated shaft, this is not actually true in a literal sense, since oils and other fluids, particularly those commonly used in large scale applications such as automobiles, include wetting agents and other surface active materials which create very tenacious adherence between the fluid and the shaft to be sealed. Consequently, a seal rides over this film of fluid rather than literally on the shaft. To a greater or less extent, one or more layers of fluid may also be relatively strongly attracted to the sealing band portion of the seal, that is, the portion of the sealing lip which contacts the oil or other fluid lying on the surface of the shaft.

Therefore, oil leakage between the seal and the shaft is not always prevented so much by close physical contact of the seal and the shaft as by the surface effect of the layers of fluid lying between the two relatively movable elements. Thus, in practice, under a given static pressure, which is ordinarily on that of the head of liquid in the confined space, a condition of equilibrium is rapidly reached wherein a bead or meniscus is formed between parts of the seal and parts of the shaft. This meniscus occupies a significant volume in the sense under consideration, that is, it represents a measurable quantity of oil, which, while not per se creating a leakage problem, is a volume disposed on the dry side of the primary sealing unit, which may at least partially be returned to the wet side thereof. The volume of this oil may vary considerably in practice, and it often becomes troublesome under conditions of high speed shaft rotation. Thus, hydrodynamic seals are often called upon to return this volume in excess of a normal meniscus volume to the sealed region. In certain cases, however, this meniscus lies axially too far from the pumping elements for them to achieve optimum pumping action. While returning this oil to the interior of the sealed area may be accomplished in different ways, it is apparent that, in a typical application, such as an automotive application, peripheral speeds of the shaft may vary considerably and therefore, a satisfactory seal is not necessarily the one having the greatest pumping rate, since such a seal might literally pump itself dry during use over extended periods at high speeds. However, such a seal should have sufficient pumping capacity to be effective at low speeds and to permit the use of a seal which is radially sized and/or urged into engagement of the shaft by a garter spring which need exert only a reasonable force.

Another consideration which is present in seal design is the matter of continued performance after a certain time has elapsed, or after a seal has been worn significantly but is still operative. Other matters which must be considered in seal design include the provision of relatively positive static seal without sacrifice of pumping characteristics.

Thus, a number of prior art seals have been characterized by good pumping action but unsatisfactory static seal performance, usually by reason of the protrusion of the dynamic or pumping elements into the static lip area. Other seals have shown sufficient pumping capacity when new, but diminished or insufficient pumping capacity after extended use. Other seals were generally satisfactory, but were not fully effective except in small areas of the shaft just adjacent the seal band. In other cases, the pumping elements themselves tended to collect on the rear surfaces thereof a film of oil which could not be returned. The present invention is directed to providing improved hydrodynamic or pumping action oil seals which are an improvement over prior known seals of the same general type, but which lack certain of the drawbacks or disadvantages thereof, and which includes a number of novel features and advantages.

Accordingly, it is an object of the invention to provide an improved oil seal with a pumping action.

A further object is to provide oil seals having plural pumping elements of different depth but lying on a common base or reference line.

Another object is to provide a method and apparatus for manufacturing a novel oil seal of the type referred to above.

A still further object is the provision of an oil seal having good static sealing performance without sacrifice of pumping capacity.

A further object is to provide an oil seal having effective pumping action over an extended service life.

A still further object is to provide an oil seal having plural pumping elements of generally wedge-like form, with several such elements being disposed in different relation to the primary lip or seal band area.

A still further object is to provide an oil seal which is easy to manufacture under conditions of accurate quality control.

A still further object is to provide an oil seal having a secondary lip lying in a plane parallel to the primary lip and having its working edge spaced radially from the working edge of the primary lip.

A still further object is to provide an oil seal with plural pumping elements and an auxiliary annular lip spaced axially apart from the primary lip.

A further object is to provide an oil seal having a primary lip and a plurality of individual wedge-like pumping elements, with several of the elements being radially spaced relative to one another and thereby adapted for successive operative engagement with an associated shaft or other relatively movable element only after a certain amount of wear has taken place with respect to certain of the other of the elements, with an auxiliary lip extending between them and lying in a plane parallel to the plane of the primary lip, whereby as the elements lying closer to the movable element wear and become less effective to pump oil, other of the elements will inherently be brought into cooperative working engagement with the movable element in order to provide continued pumping action throughout an extended life of the seal unit, and whereby the fluid is restrained by the second lip from passing too far axially from the primary lip.

These and other objects and advantages are accomplished by providing an oil or like fuel seal unit having a body portion defined by frusto-conical surfaces generally defining a primary lip and meeting to define an intended seal band contact area for an associated shaft, and also having means spaced apart from the seal band portion of the primary lip intended to contact or be closely spaced apart from the associated shaft or the like, whereby fluid may be trapped between the surrounding means and the seal band, and urged axially beneath the seal body at least one pumping element lying between the seal band and the surrounding means.

The manner in which these objects and advantages are achieved will become more clearly apparent when reference is made to the accompanying detailed description of preferred embodiments of the invention set forth by way of illustration, and when reference is made to the accompanying drawings in which like reference numerals indicate correspondings parts throughout.

BRIEF DESCRIPTION OF THE DRAWINGS

FIG. 1 is a perspective view, with portions broken away, of a radially acting shaft seal embodying the present invention;

FIG. 2 is a developed view of a portion of an inwardly facing surface of the seal unit of FIG. 1;

FIG. 3 is a vertical sectional view of an enlarged scale, showing the shaft contact pattern of the seal of the invention, taken before substantial wear of the seal has occurred;

FIG. 4 is a view through another section of the seal of FIG. 1, with the seal shown after further wear thereof;

FIG. 5 is a view through another section of the seal of FIG. 1, shown after still further wear of the seal unit;

FIG. 6 is an elevational view of a mold core used in the manufacture of seals according to the invention, and showing one method of manufacturing the core used to make such seals; and FIG. 7 is a developed view of a contact pattern typically formed on an associated shaft by the seal unit of the invention;

DESCRIPTION OF THE PREFERRED EMBODIMENTS OF THE INVENTION

Before referring to the drawings in detail, it will be understood that, although the invention is capable of application to different forms and varieties of seal units, an illustration of the principles thereof will be made by reference to a shaft seal having an elastomeric seal body bonded to a metal seal mounting portion, with the seal body including a single primary lip adapted to surround and exert an inward radial sealing force on a shaft passing therethrough and containing a secondary lip lying parallel to the plane of the first lip and a number of pumping elements adapted to engage the shaft with working surfaces thereof to force fluid lying between the lips from the exterior or dry side of the primary lip beneath the so-called seal band and into the interior or sealed region lying on the wet side of the primary lip. As used herein, the term "seal band" is used to describe an annularly extending region of primary sealing engagement between a portion of the primary lip and the shaft, although it will be understood that, properly speaking, this region may not be one of literal contact but may include a thin layer of fluid between the shaft and the seal.

Referring now to FIG. 1, there is shown a seal assembly 10 which includes an elastomeric seal body 12 bonded to a flange portion 14 of a stamping 16 which includes a radially outwardly directed, axially extending mounting flange 18. The elastomeric body 12 includes an exterior, slightly inclined radially inwardly directed outer surface 20 and an interior, somewhat more steeply inclined, radially inwardly directed surface 22 with the surfaces 20, 22 intersecting to form the edge 23 of a primary sealing lip 24. Disposed radially outwardly of the primary lip 24 is a garter spring 26 received within a groove 28 in the body 12, the spring 26 urging the sealing lip 24 into a closely overlying relation with an associated shaft 30 (FIGS. 3-5).

In normal use, immediately or shortly after the seal unit 10 is installed in place, a seal band 32 of finite width is formed along the primary sealing lip 24 and just to either side of the edge 23 thereof. Thus, referring to FIG. 2 for example, the dotted lines show the location of the edges 23 which lies within the seal band 32. As more wear takes place, the width of the seal band 32 will gradually enlarge, until it attains measurably greater width, as illustrated in FIGS. 4 and 5 for example.

Referring again to FIGS. 1 and 2, it will be noted that a plurality of pumping elements 34 are disposed in spaced apart relation on, and form a part of, the exterior surface 20. The pumping elements, generally designated 34, extend radially inwardly from the surface 20 of which they form a part to varying degrees, with the elements 34 having the greatest radial extent being designated elements 34A, those of a lesser extent elements 34B and those of still lesser and of least extent being designated as elements 34C and 34D, respectively. The rear, radially extending surfaces 36 of each element 34A, 34B, etc. are coplanar with one another, lying along a base or reference line or plane P (FIG. 2). However, each nose portion 38A, 38B, etc. of each element 34A, 34B, etc. is spaced apart from a reference line R by a different distance, reference line or plane R being coplanar with the plane of the edge 23 of the primary lip 24.

Each pumping element 34 also includes respective leading and trailing edges 40, 42, with a leading edge 40 being so designated in relation to relative shaft rotation in the direction shown by the solid lines in FIG. 2. Under such conditions, surfaces or edges 42 are trailing edges, whereas, upon opposite hand rotation of an associated shaft 30, that is, in the direction indicated by the dotted line arrows of FIG. 2, each trailing edge 42 would be a leading edge and vice versa. Since the noses 38, the edges 40, 42 and a major portion of the inwardly directed faces of the elements 34 all cooperate to collect oil and pump it beneath the seal band 32, the elements collectively are referred to herein, and in the claims, as "working surfaces," and such term is therefore intended to include any one or more of any effective portion of the elements 34.

Referring again to FIG. 2, it is shown that an auxiliary lip 44 extends circumferentially of the seal in a parallel but spaced apart relation to the primary lip 24, and that the auxiliary lip 44 includes inner and outer faces 46, 48 joined at the interrupted, annularly extending edge 50. The auxiliary or secondary lip 44 is also radially spaced somewhat from the edge 23 of the primary lip 24. Thus, the auxiliary lip 44 is a counterpart to the primary lip 24, except that it is interrupted by the periodic occurrence of the pumping elements 34 about the outer face 20 of the seal 10. Since the elements 34A-34D are of differing radial extent, the edge 50 of the auxiliary lip 44 extends almost entirely across the surfaces of elements 34D, and only slightly into the inner surfaces of elements 34A, and to an intermediate extent in respect to elements 34B and 34C. In this connection, it will be observed that there might typically be only one each of elements 34A or there may be two, three, four or more each of such elements. Likewise, there might be only one or several of the elements 34B-D. Also, the elements 34 may occur in only one, two, three or four sizes, or in more sizes. Typically, in a seal of moderate dimensions, however, there might be two or three each of four sizes of elements 34, with all of the elements typically spaced equally apart about the exterior inclined surface 20 of the seal body 12.

Referring now to FIG. 3, it will be assumed that a seal has just been installed in position of use with an associated shaft 30, and that, for purposes of illustration, the edge 23 of the primary lip 24 forms a seal band of minimal axial extent. A rear edge portion 52 of the largest size pumping element 34A just contacts the shaft, while the edge 50 of the auxiliary lip 44 is spaced somewhat radially apart from the shaft. A region 54 is thereby defined between the seal band 32 and an effective edge 50 of the lip 44 or edge 52 of the pumping element 34. Accordingly, shaft rotation will result in a hydrodynamic wedging action tending to force oil within the region 54 beneath the lip 24 and into the region 56 to be sealed. Since the oil cannot escape axially outwardly of the lip 44, all oil in the region 54 is subject to being returned to the sealed region. Furthermore, the lip 44 keeps oil from accumulating on the rear surfaces 36 of the elements 34.

Referring now to FIG. 4, a condition is shown wherein the seal band 32 has been axially enlarged by reason of substantial wear, the edge 52 of another reduced size pumping element 34B is in contact with the shaft, and the edge 50 of the auxiliary lip 44 is in actual or virtual contact with the shaft 30. Accordingly, oil is held within the region 54 by the lip 44 until one of the elements 34B contacts it to force the oil beneath the seal band 32. For purposes of considering FIG. 4, it will be assumed that the configuration of a larger element 34 has already been changed by wear so that its pumping action is lessened or substantially eliminated. Accordingly, excellent pumping action is maintained throughout the life of the seal. Referring to FIG. 5, it is shown that the area 54 is of diminished cross-section, that a rear edge 52 of an element 34C is in contact with the shaft and that there is substantial contact between the edge 50 of the lip 44. This condition is present after the greatest amount of wear has taken place.

Accordingly, it will be seen that, as wear continues, successive sets of working surfaces will be brought into contact with the shaft 30, and that at no time will an excessive number of working surfaces be operatively engaged with the shaft 30 so as to cause an excessive pumping rate. This is because, after substantial wear, the contact pattern of each of the elements 34 changes from an initial configuration wherein relatively inclined surfaces are presented to the rotatable member to a worn condition wherein these surfaces approach a perpendicular disposition with respect to direction of shaft travel. Thus, as more effective elements come into play, formerly effective elements become less effective or ineffective.

In FIGS. 3-5, a construction is shown wherein the working surfaces of the elements lying most closely adjacent the shaft 30 are somewhat inclined rather than parallel to or in contact with the shaft throughout their entire axial extent. This illustrated construction is sometimes preferred and operates well, but is not a necessary feature of the invention, since these working surfaces may be made either parallel to the shaft surface, or may be disposed at a slight angle thereto.

Referring now to FIG. 6, one method of making the seal assemblies 10 of the invention is illustrated. As shown in FIG. 6, a mold core 58 includes a frusto-conical barrel cone 60, which, at line 62 joins a slightly inclined frusto-conical surface 64. As is well known in the seal making art, oil seals are customarily made by compression or transfer molding using molds having an inner mold core such as the core 58 and one or more outer mold elements (not shown) which combine to define a cavity for molding the part. FIG. 6 shows that, with the insert 58 in place in a mold, the seal body surfaces 20, 22 would be formed respectively by mold core surfaces 60, 64 and that the edge 23 of the primary lip 24 would be formed along line 62. Accordingly, the outwardly projecting elements 34 on the seal body 12 are formed by inwardly directed cuts or notches 66 in the core 58, while the secondary lip 44 is formed by the groove 68. The notches 66 are formed by passing a rotating cutting tool 70 along a straight line just radially inwardly of a tangent to an edge of the barrel cone 60. The cutting tool 70 is rotated along an axis which lies parallel to the center line of the barrel cone. Thus, the base line of each notch 66 is in the form of a chord extending between slightly spaced apart points on the circumference of the cone 60. The groove 68 is formed by passing a second cutting tool 72 around the periphery of the barrel cone 58, with the tool 72 being kept at a constant radius lying just inwardly of the surface of the barrel cone 60 and axially spaced from line 62. In the preferred form shown, the groove 68 is cut in such a manner that its depth is just less than the depth of the shallowest notch 66 in the cone 60. Since these cutting operations are simple and straightforward, mold cores such as the core 58 are easy to manufacture. The remainder of the mold parts may be entirely conventional, since the seal of the invention differs from conventional seals only in the provision of the elements 34 and the auxiliary lip 44.

Referring now to FIG. 7, a fragmentary developed view of the contact pattern made on an associated shaft by the seal of the invention is shown. Whereas FIG. 2 shows a view of the inner surface of a typical seal unit per se, FIG. 7 may be thought of as showing the contact pattern actually formed on an associated shaft such as the shat 30. Inasmuch as pumping elements 34A, 34B, etc., are shown in FIGS. 1–5 to be flat, and to form a chord across an inner portion of the frusto-conical seal surface, it will be understood that the entire surface of the element 34A does not actually contact the shaft in use. Accordingly, the leading and trailing edges 40, 42 referred to above actually form the leading and trailing edges of a typical element 34A as a whole rather than the leading and trailing edges of the portion of the element 34 actually contacting the surface of the shaft 30. Thus, FIG. 7 illustrates that the actual or working surface contact pattern, which is generally designated 74, is of somewhat congruent shape but of reduced circumferential and axial extent with respect to the corresponding dimensions of a typical entire element 34A. Accordingly, the actual contact pattern may be said to be of a truncated elliptical form and to be defined by a working surface leading edge 76, a working surface trailing edge 78 and a nose portion 80. A rear surface 82 of the working surface 74 is, however, coplanar with the rear, radially extending surface 36 of the entire element 34A. FIG. 7 also illustrates that, upon occurrence of a certain amount of wear, the secondary or auxiliary lip 44 makes contact with the shaft and that this contact pattern may blend gradually into the contact area 74. In this form of seal, the entire area 74 is subjected to pressure tending to lift the seal from the shaft or to reduce the sealing pressure thereon, with the result that oil flows beneath the contact area of the primary lip 24, and is kept axially inside the secondary lip 44.

The foregoing description of a preferred form of seal was made with respect to a seal having a radially inwardly directed primary sealing lip with the elements 34 having their inner surfaces at either the same or a greater radial distance from the seal center than the radius of the primary lip. However, the principles of the invention are equally applicable to radially outwardly acting seals. In such a case, the elements which come into play upon further wear of the seal would be disposed on loci of reduced radius rather than increased radii.

Likewise, the secondary or auxiliary lip concept is applicable with other forms of seals using different forms of pumping elements, including so-called helix pumping seals, sine wave or other sinuous pumping lip seals, triangle seals and the like.

Inasmuch as the amount of wear undergone by oil seals in use is relatively small from the standpoint of absolute dimensions, it will be understood that many of the reference dimensions herein are only a few thousandths of an inch in actual practice and that portions of the accompanying drawings are in some cases exaggerated for purposes of illustration.

In connection with the foregoing description, it will also be appreciated that, inasmuch as the size of the shaft to be sealed will not change in use, the working surface portions of the pumping elements 34 are molded so that, in a relaxed or unstressed condition, the working surfaces of even the elements spaced radially farthest from the shaft or other part to be sealed would be of equal or smaller effective diameter than the shaft. As installed, however, in the case of a radially inwardly acting seal, the elastomeric seal body is stretched somewhat to attain an enlarged diameter, and the radially innermost working surfaces initially contact the shaft. As wear occurs, the other working surfaces gradually come into contact with the shaft since wear in the area of the primary seal band permits the elastomeric body as a whole to attain a reduced diameter so that the remaining elements can become effective.

Seals made according to the present invention have proved to provide a long life and a consistent pumping action throughout an extended seal life. The provision of the auxiliary or secondary lip appears to make possible the confinement of the oil to the region adjacent the working surfaces of the elements and prevents oil accumulation on the rear of the elements and the buildup of too large a meniscus. Accordingly, it may be seen that the present invention provides a novel oil seal having a number of advantages and characteristics including those pointed out and others which are inherent in the invention. Since it is anticipated that modifications or changes to the embodiments described in detail will occur to those skilled in the art, it is anticipated that such changes may be made without departing from the spirit of the invention or the scope of the appended claims.

I claim:

1. An oil seal assembly having an elastomeric body portion including a pair of frusto-conical surfaces joined to each other along a seal band portion adapted for engagement with a relatively movable element, a plurality of pumping elements disposed on the one of said frusto-conical surfaces lying outside the region to be sealed, each of said pumping elements having a working surface portion lying, as said seal is installed on an associated movable element, generally parallel to the movable element to be sealed, said working surface portions being radially spaced from one another, with at least one of said working surfaces being of substantially equal radial extent with said seal band portion prior to substantial use of said seal assembly and the working surface portion of at least one of said other elements being radially spaced apart from said working surface of equal radial extent, and an auxiliary lip extending between said elements in a plane substantially parallel to the plane of said primary lip and spaced apart therefrom, whereby, in use, said auxiliary lip at least partially confines oil to the region between said lips and whereby, upon wearing of said primary lip portion, said at least one working surface of said at least one spaced apart element will contact a portion of said movable element.

2. A radially acting hydrodynamic oil seal assembly for use with an axially extending, relatively movable sealed member, said seal assembly including a seal body partially defined by first and second, generally frusto-conical seal body surfaces meeting each other along an annular area to form a primary seal band, and at least one pumping element formed on said first frusto-conical surface and extending radially and axially therefrom, the radially extending portion of said element consisting of a single surface having its leading edge portion, nose portion and trailing edge portions respectively formed by a single, generally curvilinear line, the nose portion of said line lying toward said seal band area and being spaced axially from said seal band area, the plane of said single surface being slightly inclined from the axis of said movable sealed member such that the portions of said single surface lying toward said nose portion are spaced farther radially from said movable sealed member than are the portions of said single surface lying farther from said nose portion, whereby said single surface forms an inclined circumferential chord across spaced apart portions of said seal body surface, and whereby, in the use of said seal, said sealed movable member will engage working surface portions of said single surface, said working surface forming on said movable member a contact pattern which includes a generally curvilinear margin with the nose thereof also lying in the direction of said seal band and being also spaced axially apart therefrom, said seal further including an auxiliary lip extending between said pumping elements, said auxiliary lip being spaced from said seal band area and lying in a plane generally parallel to the plane of said seal band area.

3. An oil seal assembly as defined in claim 2 wherein a plurality of said pumping elements are provided.

4. An oil seal assembly as defined in claim 2 wherein said single surface is a flat surface.

5. An oil seal assembly as defined in claim 2 wherein said single surface is a surface of revolution of a straight line, the radius of curvature thereof being substantially greater than the radius of curvature of said annular area.

6. An oil seal assembly as defined in claim 2 wherein a plurality of said pumping elements are provided and wherein said single surfaces on certain of said pumping elements are spaced radially from the center of said sealed member a different distance from the counterpart single surfaces on the other of said plurality of pumping elements.

* * * * *